United States Patent
Wang et al.

(10) Patent No.: US 11,317,021 B2
(45) Date of Patent: Apr. 26, 2022

(54) DISPLAY DEVICE AND CONTROL CIRCUIT THEREOF

(71) Applicant: BOE TECHNOLOGY GROUP CO., LTD., Beijing (CN)

(72) Inventors: Wenbo Wang, Beijing (CN); Pao Ming Tsai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 493 days.

(21) Appl. No.: 16/334,474

(22) PCT Filed: May 10, 2018

(86) PCT No.: PCT/CN2018/086287
§ 371 (c)(1),
(2) Date: Mar. 19, 2019

(87) PCT Pub. No.: WO2018/214739
PCT Pub. Date: Nov. 29, 2018

(65) Prior Publication Data
US 2021/0297590 A1    Sep. 23, 2021

(30) Foreign Application Priority Data
May 23, 2017   (CN) .......................... 201710370329.0

(51) Int. Cl.
*H04N 5/232*   (2006.01)
*G09G 3/00*    (2006.01)
(Continued)

(52) U.S. Cl.
CPC ......... *H04N 5/23235* (2013.01); *G09G 3/035* (2020.08); *H04M 1/0264* (2013.01);
(Continued)

(58) Field of Classification Search
CPC ............. H04N 5/23235; H04N 5/2257; H04N 5/232411; H04M 1/0268; H04M 1/0264;
(Continued)

(56) References Cited

U.S. PATENT DOCUMENTS

| | | | |
|---|---|---|---|
| 2013/0044240 A1* | 2/2013 | Leskela ................ | H04N 5/2258 348/239 |
| 2014/0285476 A1* | 9/2014 | Cho .................... | H04M 1/0268 345/204 |
| 2016/0085319 A1* | 3/2016 | Kim .................... | G06F 3/04847 345/156 |

FOREIGN PATENT DOCUMENTS

| | | |
|---|---|---|
| CN | 203278901 U | 11/2013 |
| CN | 105516410 A | 4/2016 |

(Continued)

OTHER PUBLICATIONS

International Search Report of PCT/CN2018/086287 in Chinese, dated Jul. 31, 2018, with English translation.
(Continued)

*Primary Examiner* — Mekonnen D Dagnew
(74) *Attorney, Agent, or Firm* — Collard & Roe, P.C.

(57) ABSTRACT

A display device and a control circuit thereof are provided. The display device includes: a display panel that is foldable and a housing that is foldable and used for supporting the display panel. The display panel has a folding axis and is divided into a first display area and a second display area along the folding axis; the first display area and the second display area partially overlap in a case where the display panel is in a folded state along the folding axis, and the second display area comprises a non-overlapping portion that does not overlap the first display area; and a component is provided at a position of the housing supporting the non-overlapping portion.

20 Claims, 7 Drawing Sheets vertical view front view (51) Int. Cl.
    *H04M 1/02* (2006.01)
    *H04N 5/225* (2006.01)
    *H05K 5/00* (2006.01)
(52) U.S. Cl.
    CPC ........ *H04M 1/0268* (2013.01); *H04N 5/2257* (2013.01); *H04N 5/232411* (2018.08); *H05K 5/0017* (2013.01); *G09G 2340/0407* (2013.01)
(58) Field of Classification Search
    CPC ........... G09G 3/035; G09G 2340/0407; H05K 5/0017
    See application file for complete search history.

(56) References Cited

FOREIGN PATENT DOCUMENTS

| | | |
|---|---|---|
| CN | 106355999 A | 1/2017 |
| CN | 106484351 A | 3/2017 |
| CN | 107180597 A | 9/2017 |

OTHER PUBLICATIONS

Notice of Transmittal of the International Search Report of PCT/CN2018/086287 in Chinese, dated Jul. 31, 2018.
Written Opinion of the International Searching Authority of PCT/CN2018/086287 in Chinese, dated Jul. 31, 2018 with English translation.

* cited by examiner

DISPLAY DEVICE AND CONTROL CIRCUIT THEREOF

CROSS REFERENCE TO RELATED APPLICATIONS

This application is the National Stage of PCT/CN2018/086287 filed on May 10, 2018, which claims priority under 35 U.S.C. § 119 of Chinese Application No. 201710370329.0 filed on May 23, 2017, the disclosure of which is incorporated by reference.

TECHNICAL FIELD

Embodiments of the present disclosure relate to a display device and a control circuit thereof.

BACKGROUND

With the development of equipments having display devices such as smartphones and tablets, display panels that are foldable become a trend. However, with the diversification of applications (especially video play applications and mobile game applications) installed in the display device including the display panel, the user's requirement for the area of the display region of the display panel also tends to be a need for a display panel with a large screen.

In related technologies, the display area of the display panel is enlarged by implementing the design of no border frame or narrow border frame of the display panel, that is, a "black border" around the display panel is removed or narrowed, thereby providing a better visual experience for the user. However, some front components in the display device, such as a front camera, etc., is provided depending on the border frame. Therefore, how to realize the effect of no border frame or narrow border frame without affecting the functional service of the front components becomes an urgent problem to be solved.

SUMMARY

An embodiment of the present disclosure provides a display device and a control circuit, which can increase a display available area of the display panel, improve resource utilization rate, and reduce production costs, while do not affect the functional service of the front component.

A display device provided by an embodiment of the present disclosure includes: a display panel that is foldable and a housing supporting the display panel. The display panel is divided into a first display area and a second display area along a folding axis in a folded state, and the second display area comprises a non-overlapping portion that does not overlap the first display area; and a front component is provided at a position of the housing supporting the non-overlapping portion.

According to the display device provided by the embodiment of the present disclosure, the front component is provided on the housing corresponding to an interlaced position of two display areas, so the front component on the housing can be converted into a forward state toward the front when the display panel is folded, and the front component on the housing can be converted into a rearward state toward the rear when the display panel is unfolded, so that a display available area of the display panel is increased, resource utilization rate is improved, and production costs are reduced, while functional services provided by the front component are not affected.

Another embodiment of the present disclosure provides a control circuit which is configured to control display of the display device of the above embodiment.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

A display device and a control circuit according to the embodiments of the present disclosure will be described below with reference to the accompanying drawings.

The display device may be a device on an equipment such as a mobile phone, a tablet computer, a personal digital assistant, a wearable device, etc., and controls the display of the equipment.

Figure 1A:
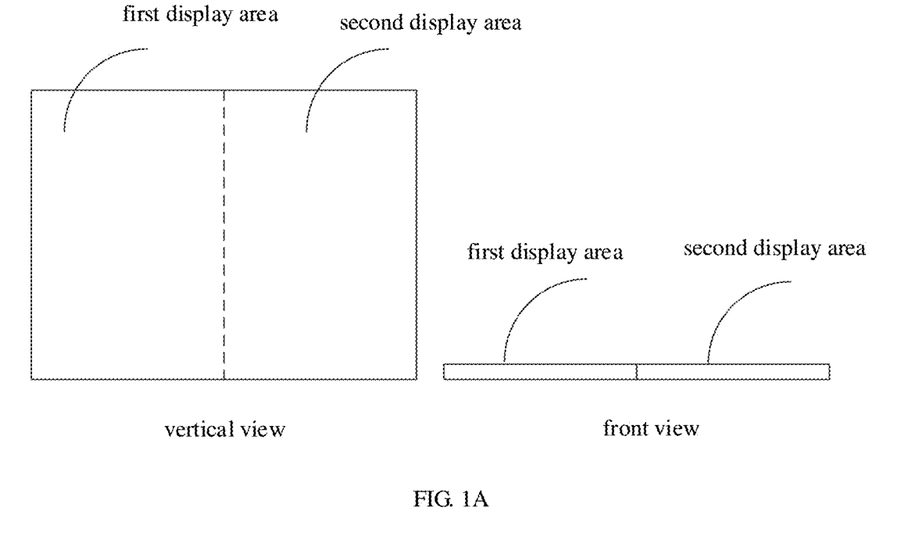
FIG. 1A is a structural schematic diagram of a known display panel.
Figure 1B:
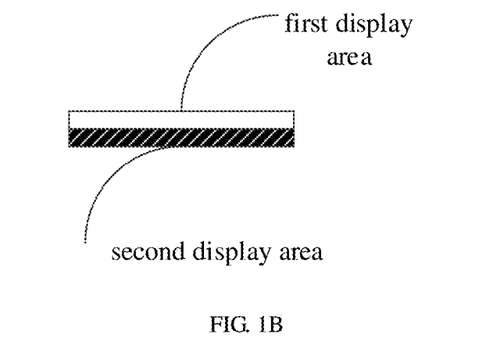
FIG. 1B is a structural schematic diagram of a known display panel that is folded.

In order to more clearly explain technical problems of the display device in the prior art described above, a display panel that is two-foldable is taken as an example. As shown in FIG. 1A, the display panel that is foldable is divided into a first display area and a second display area. When the display panel is in a tablet mode, as shown in FIG. 1A, the first display area and the second display area form a plane for display, and when the display panel is in a mobile phone mode, as shown in FIG. 1B, the second display area is folded to the back of the first display area, and the first display area provides a display service.

Figure 1C:
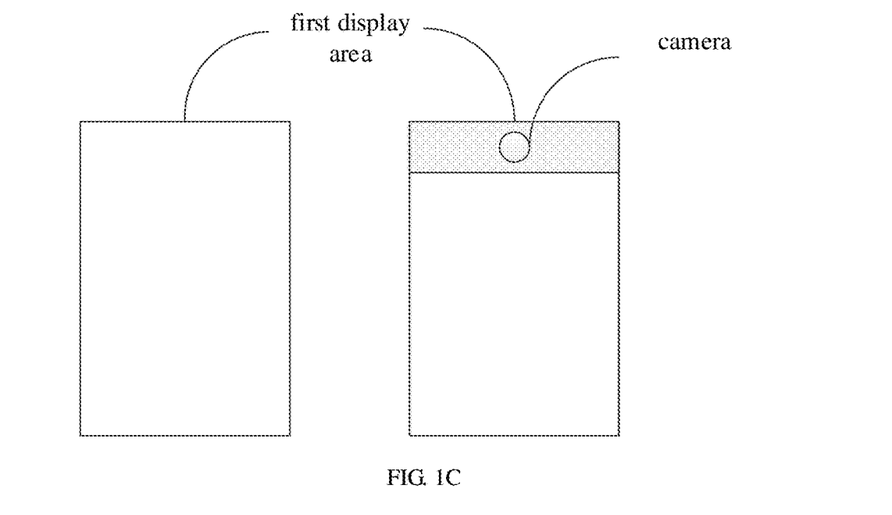
FIG. 1C is a structural schematic diagram of another known display panel.

However, referring to the left diagram of FIG. 1C, in the mobile phone mode, if a service of the front camera is needed by users, the front camera cannot be installed when the control panel needs to be designed with no border frame or narrow border frame (narrow border frame is not shown in FIG. 1C). If the front camera is installed, as shown in the right diagram of FIG. 1C, it is necessary to disposed a border frame in the first display area, which reduces an area of the display region.

In order to solve the contradiction between absence of border frame (or narrow frame) and the front component such as a camera, a display device is provided in the embodiment of the present disclosure, which can increase a display available area of the display panel, improve resource utilization rate, and reduce production costs, by providing a front component on a housing corresponding to an interlaced position of two display areas, the front component on the housing can be converted into a frontward state toward the front when the display panel is folded, and the front component on the housing can be converted into a rearward state toward the rear when the display panel is unfolded.

Figure 2A:
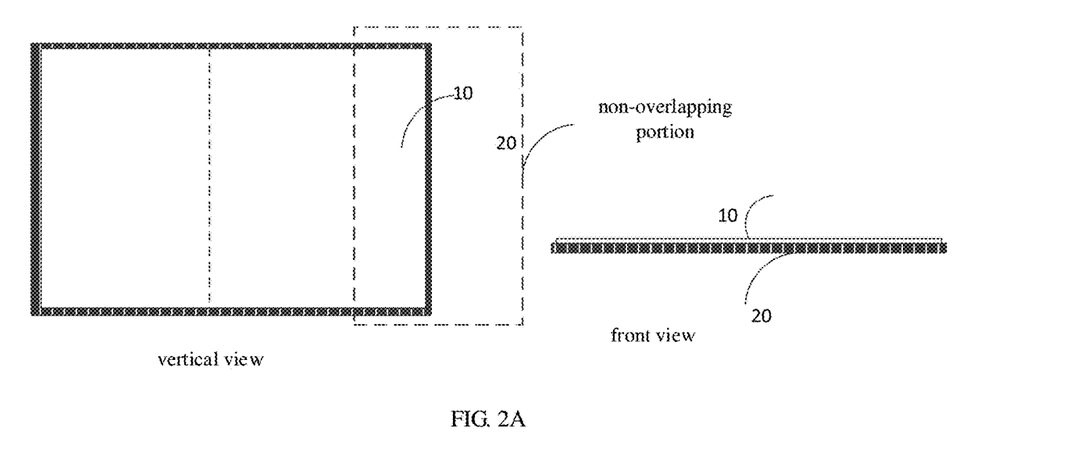
FIG. 2A is a structural schematic diagram of a display device according to a first embodiment of the present disclosure.

FIG. 2A is a structural schematic diagram of a display device according to a first embodiment of the present disclosure. As shown in FIG. 2A, the display device includes a display panel 10 that is foldable and a housing 20 supporting the display panel 10.

Figure 2B:
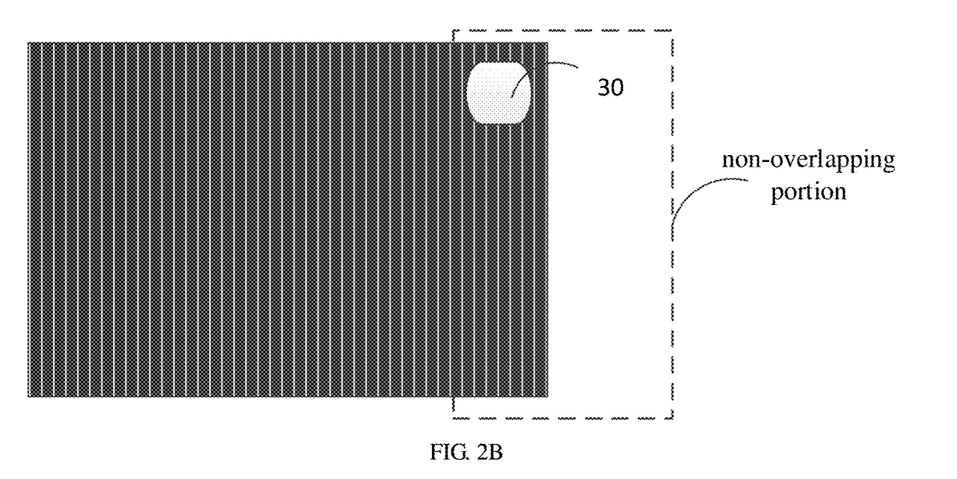
FIG. 2B is a structural schematic diagram of a back surface of a display device according to the first embodiment of the present disclosure.

The display panel 10 is divided into a first display area and a second display area along a folding axis in a folded state, and the second display area includes a non-overlapping portion that does not overlap the first display area. As shown in FIG. 2B, a front component 30 is provided at a position of the housing 20 supporting the non-overlapping portion.

In addition, the front component 30 may be disposed at different positions of the housing 20 supporting the non-overlapping portion, and the number of the front components 30 may be one or more, according to different specific application scenarios.

Figure 3A:
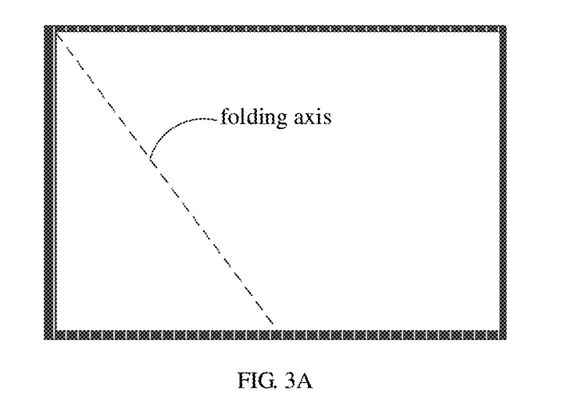
FIG. 3A is a schematic diagram of a position of a folding axis in a display panel according to an embodiment of the present disclosure.
Figure 3B:
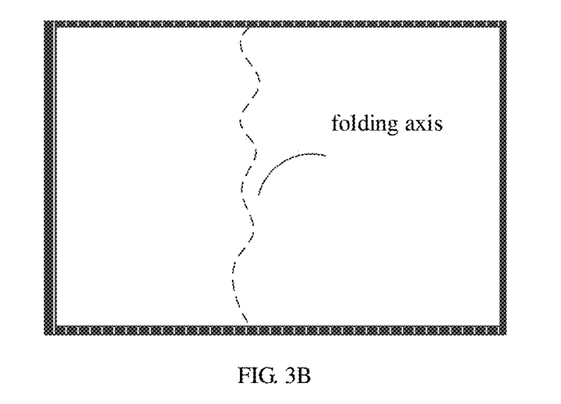
FIG. 3B is a schematic diagram of a position of a folding axis in a display panel according to another embodiment of the present disclosure.

In practical applications, the folding axis may be parallel to either side of the display panel 10, and for example, as shown in the left diagram of FIG. 2, the folding axis is parallel to the short side of the display panel 10. Of course, with the progress of manufacturing technology of the display panel, the folding axis of the display panel 10 that is foldable can also be in any direction, and as shown in FIG. 3A, it may be nonparallel to any side of the display panel, and the folding axis may also be any shape, and for example, as shown in FIG. 3B, it may be a wave shape or the like.

It should be noted that, in this embodiment, the number of the display areas that are foldable, to which the display panel 10 is divided, may be different according to different specific application scenarios, for example, three, four, or the like. For convenience of description, two display areas including the first display area and the second display area are mainly taken as an example in this embodiment.

For example, in the present embodiment, the display panel 10 is disposed to include the first display area and the second display area which are not completely overlapped, so that the front component 30 on the housing 20 at the non-overlapping portion is changed from the rearward state to the frontward state after being folded, and a functional service is provided when the first display area or the second display area is operated, thereby it is not necessary to provide the border frame carrying the front component 30 in the display area, and the function service provided by the front component 30 is not affected.

Figure 4A:
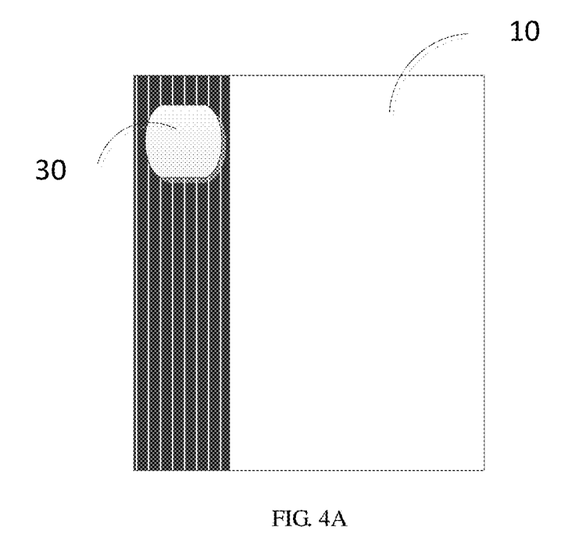
FIG. 4A is a structural schematic diagram of a display panel in an outward folded state according to an embodiment of the present disclosure.
Figure 4B:
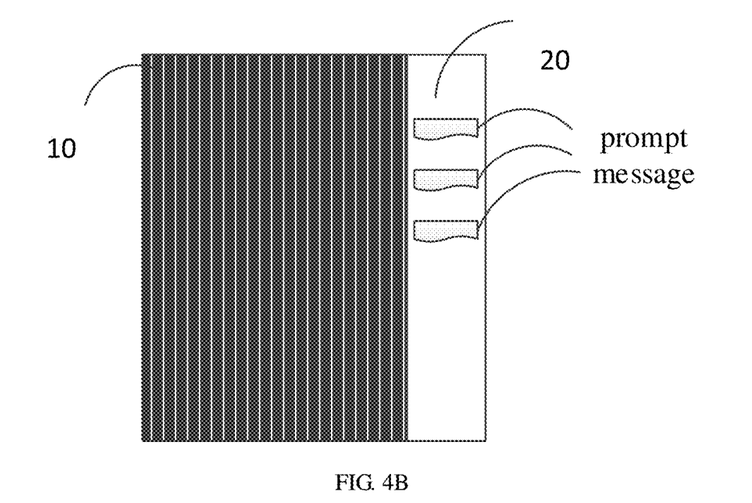
FIG. 4B is a structural schematic diagram of a display panel in an inward folded state according to an embodiment of the present disclosure.

However, in practical applications, it is possible that the folding direction of the display panel 10 is outward. In the application scenario with the outward folded state, as shown in FIG. 4A, the front component 30 is provided at the position of the housing supporting the non-overlapping portion to provide a functional service for the current display area; and when the folding direction of the display panel 10 is inward, as shown in FIG. 4B, the display area corresponding to the non-overlapping portion displays. In order to further improve the user's experience, prompt information (i.e., prompt messages) such as message reminders, missed calls, power information and the like may be displayed at the non-overlapping portion, so that the user can obtain the relevant information without opening the display device.

Based on the above description, it should be understood that the front component 30 in the embodiment of the present disclosure may be a camera component, a fingerprint unlocking component, a volume component, and the like. In order to more clearly describe the operation flow of the display device in the embodiment of the present disclosure, the following takes the front component including a camera as an example for description.

Figure 5:
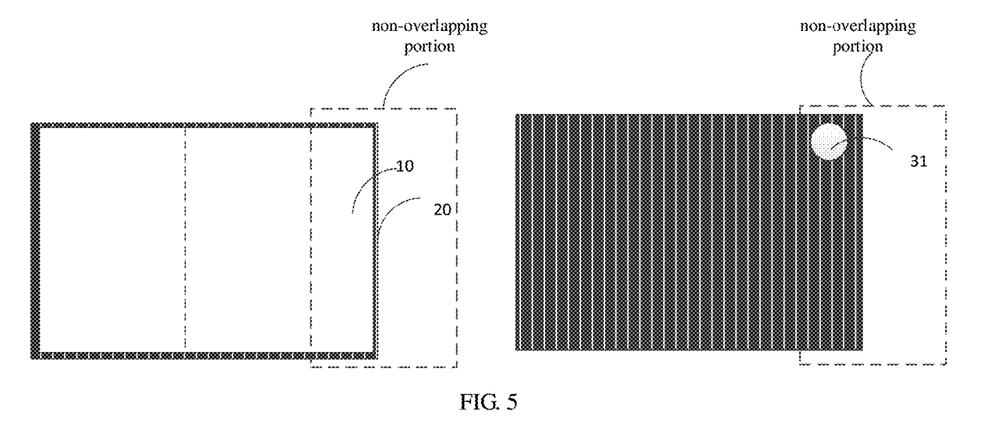
FIG. 5 is a structural schematic diagram of a display device according to a second embodiment of the present disclosure.

FIG. 5 is a structural schematic diagram of a display device according to a second embodiment of the present disclosure. As shown in the left diagram of FIG. 5, the front side of the display device includes a display panel 10, a housing 20, and as shown in the right diagram of FIG. 5, the back side of the display device includes a camera 31.

Figure 6:
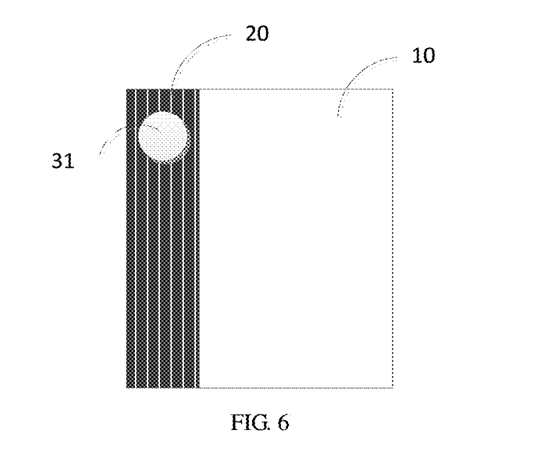
FIG. 6 is a structural schematic diagram of a display device in a folded state according to an embodiment of the present disclosure.

For example, as shown in the right diagram of FIG. 5, when the display panel 10 is in an unfolded state, it can be regarded that the display device is in a tablet mode currently, and the camera 31 on the housing 20 provides a photographing service for the display device in the tablet mode. As shown in FIG. 6, when the display panel 10 is in a folded state, it can be regarded that the display device is in a mobile phone mode, so that in order to satisfy the self-photographing function in the mobile phone mode, as shown in FIG. 6, the camera 31 on the housing emerges from the housing 20 corresponding to the non-overlapping portion, and becomes the frontward state, thereby providing the service of the front photographing for the user.

However, during the actual execution process, the folding and unfolding of the display panel 10 causes a large change in the display area. For one image, it is possible that the image is displayed clearly in the display panel 10 that has been folded, but displayed with much noise, etc., in the display panel 10 that has been unfolded. Moreover, the power consumptions of the display panel 10 in the two states may also be different. For example, when the display panel 10 is in the folded state, the display panel 10 is controlled in a low power consumption mode, and at this time, the camera 31 should be configured to image by a low resolution with low energy consumption. Thus, in order to provide a better functional experience, the front camera 31 needs to adjust the resolution of the imaging according to the current state of the display panel 10.

For example, in the embodiment of the present disclosure, in order to avoid unnecessary power consumption, the camera 31 is configured to image by a first resolution when the display panel 10 is in the folded state, and the camera 31 is configured to image by a second resolution when the display panel 10 is in the unfolded state. In order to provide a better display effect, the first resolution matches with the resolution of the first display area, and the second resolution matches with the resolution of the display panel.

For example, when the resolution of the display panel 10 in the unfolded state is 2A*B, the camera 31 is configured to take an image by a resolution of 2A*B, and when the resolution of the display panel 10 in the folded state is A*B, the camera 31 is configured to take an image by a resolution of A*B.

It should be noted that, if the front component 30 in the embodiment of the present disclosure is other component, in order to provide a better functional service, the function adjustment of the display panel 10 is also required according to the display state of the display panel 10, and details are not described herein.

Thus, the display device of the embodiment of the present disclosure presents different display areas in the display panel 10 that is foldable in an unaligned form, so that the rear component on the housing corresponding to the non-overlapping portion becomes the front component 30 after being folded, and therefore, the function service is provided for the current display area, so the corresponding function service is not affected in a case where the utilization rate of the display area is ensured, and the front component is shared by the display panel 10 in the unfolded state and the display panel 10 in the folded state, which can greatly save production costs.

Figure 7:
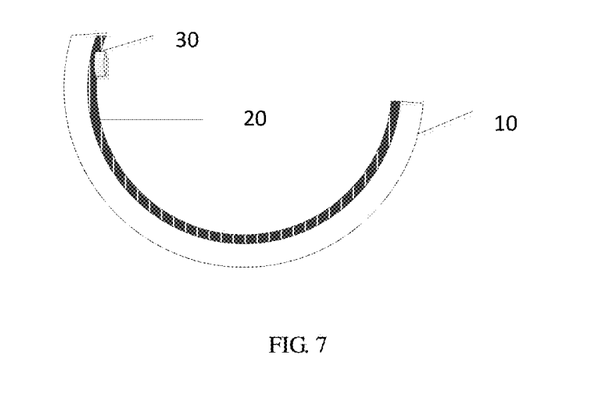
FIG. 7 is a structural schematic diagram of a display device in a non-fitting and folded state according to an embodiment of the present disclosure.

It should be noted that the principle is applicable to the non-overlapping portion of any form of display device, that is, in addition to the application scenario of the physically-fitted folding mode described in the above embodiments, as shown in FIG. 7, the non-overlapping portion may also be implemented in a spatially non-contact manner. The implementation principles of the above two methods are similar, and are not described again here.

In summary, the display device of the embodiment of the present disclosure is provided with the front component on the housing corresponding to an interlaced position of two display areas, so the front component on the housing can be converted into a frontward state toward the front when the display panel is folded, and the front component on the housing can be converted into a rearward state toward the rear when the display panel is unfolded, so that a display available area of the display panel is increased, resource utilization rate is improved, and production costs are reduced, in a case where functional services provided by the front component are not affected.

In order to implement the above embodiments, the present disclosure also provides a control circuit for controlling display of the display device described in the above embodiments.

Figure 8:
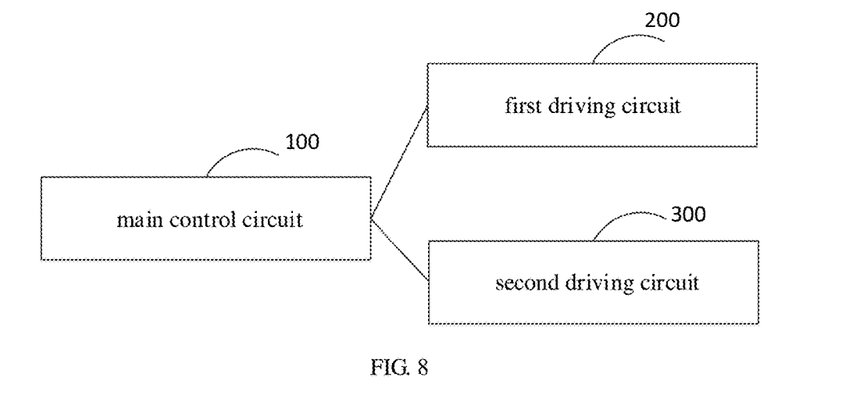
FIG. 8 is a structural schematic diagram of a control circuit according to a first embodiment of the present disclosure.

FIG. 8 is a structural schematic diagram of a control circuit according to a first embodiment of the present disclosure. As shown in FIG. 8, the control circuit includes a main control circuit 100, a first driving circuit 200 configured to drive the first display area of the display device, and a second driving circuit 300 configured to drive the second display area of the display device.

As shown in FIG. 8, the main control circuit 100 is electrically connected to the first driving circuit 200 and the second driving circuit 300, and is configured to control the first driving circuit 200 and the second driving circuit 300 according to the folded state of the display panel of the display device.

In the following, the control process of the main control circuit 100, when that the display panel is respectively in the folded state and the unfolded state is taken as an example, is described in detail to explain how the main control circuit 100 controls the first driving circuit 200 and the second driving circuit 300 according to the folded state of the display panel of the display device.

Scenario 1: the display panel is in a folded state.

For example, in this application scenario, the main control circuit 100 is configured to control the first driving circuit 200 to drive the first display area to display, and control the second driving circuit 300 to drive the second display area to be in a sleep mode, when the display panel is in an outward folded state. Therefore, when the display panel is in the folded state, the second display area that does not provide the display service is controlled to be in a sleep state, thereby avoiding unnecessary energy consumption.

In an embodiment of the present disclosure, the main control circuit 100 is configured to control the second driving circuit 300 to drive the second display area to display in the non-overlapping portion when the display panel is in an inward folded state. For example, prompt information, such as missed calls, power information, weather information, etc., is displayed, or, according to the user's personalized needs, relevant information of the user-specified applications, such as the stock information in the stock application specified by the user, is displayed.

For example, in this embodiment, when the display panel is in the inward folded state and the prompt information to be displayed is generated or acquired, for example, a missed call is currently obtained, in order to enable the user to know the relevant prompt information without opening the display panel, the prompt information is transmitted to the second driving circuit 300 by the main control circuit 100, so that the second driving circuit 300 drives the second display area to perform display according to the prompt information.

Scenario 2: The Display Panel is in the Unfolded State.

For example, in the application scenario, the main control circuit 100 controls the first driving circuit 200 to drive the first display area and controls the second driving circuit 300 to drive the second display area when the display panel is in the unfolded state.

Figure 9:
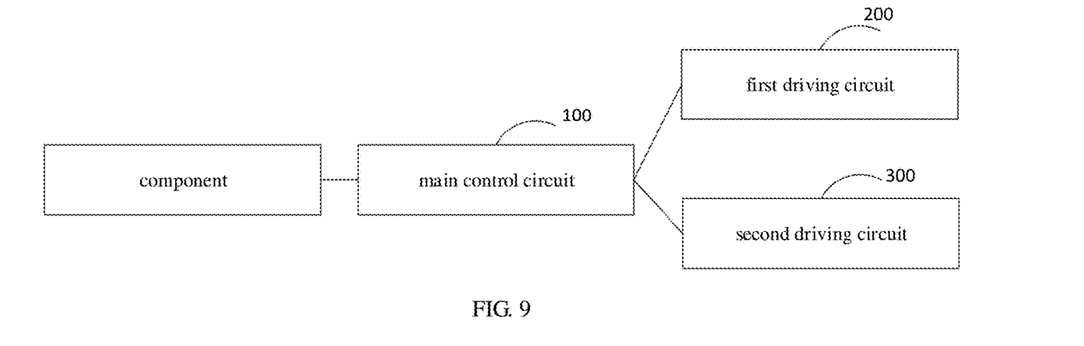
FIG. 9 is a structural schematic diagram of a control circuit according to a second embodiment of the present disclosure.

Based on the above description, it should be understood that, as shown in FIG. 9, the main control circuit 100 in the embodiment of the present disclosure is also connected to the front component. Therefore, when the display panel is in the unfolded state, the main control circuit 100 controls the front component to be in a rear working state, and when the display panel is in the folded state, because the non-overlapping portion, where the front component is located, is folded, the front component is in the frontward state, so that the main control circuit 100 controls the front component to be in a front working state.

In order to clearly describe how the main control circuit 100 controls the operation of the front component according to different states of the display panel, hereinafter, when the front component is a camera, the control of the camera by the main control circuit 100 in different states of the display panel is taken as an example for description.

Figure 10:
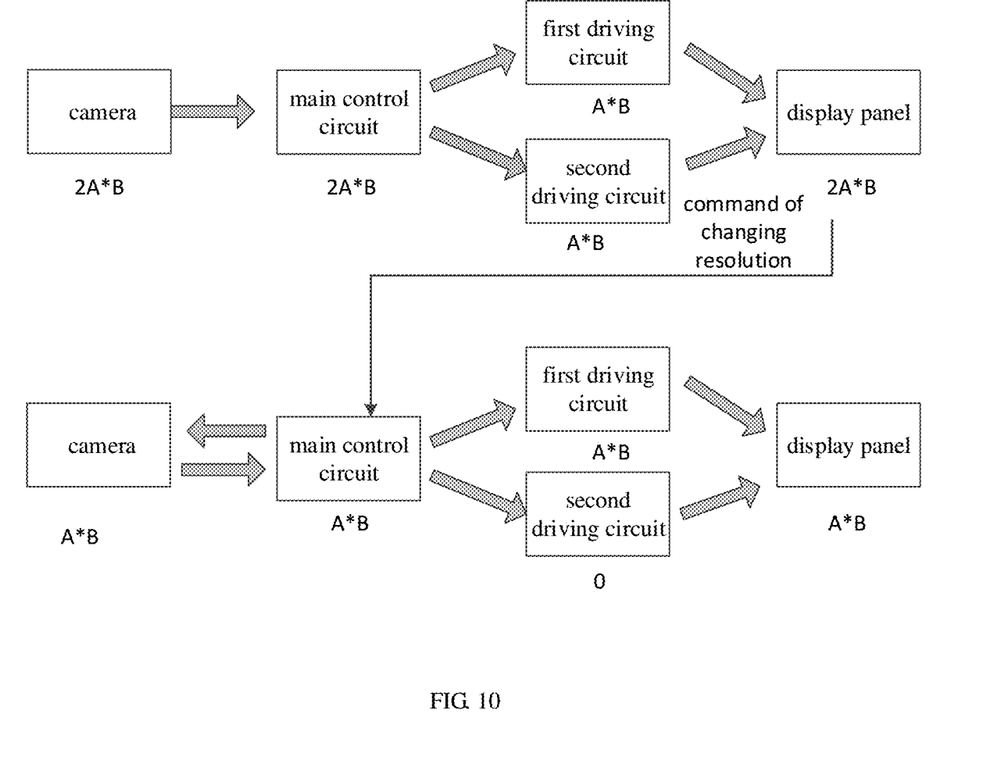
FIG. 10 is a control flow chart of a control circuit according to an embodiment of the present disclosure.

As shown in FIG. 10, when the front component is a camera, the main control circuit 100 is electrically connected to the camera in the front component of the display device.

For example, in an embodiment of the present disclosure, as shown in a lower portion of FIG. 10, if the display panel is in an outward folded state, the image signal acquired by the camera is transmitted to the first driving circuit 200 when the camera is activated, therefore, the first driving circuit drives the first display area to display according to the acquired image signal.

In another embodiment of the present disclosure, as shown in an upper portion of FIG. 10, if the display panel is in the unfolded state, when the camera is activated, the main control circuit 100 correspondingly transmits a part of an image signal of a single frame acquired by the camera to the first driving circuit 200, and correspondingly transmits another part of the image signal to the second driving circuit 300. Therefore, the first driving circuit 200 drives the first display area to display according to the part of the image signal, and the second driving circuit 300 is specifically configured to drive the second display area to display according to the another part of the image signal.

It should be emphasized that in this example, in order to avoid unnecessary energy consumption and to improve the display effect, the resolution of the image captured by the camera differs depending on the state of the display panel.

For example, referring to FIG. 10, the resolution of the display panel that is unfolded is 2A*B. When the main control circuit 100 senses the command signal sent by the display panel, the command signal may be a signal generated when the relevant sensor senses that the display panel is in an outward folded state, and the main control circuit 100 changes the resolution of the camera to A*B. Because the camera can support two resolutions which are 2A*B and A*B, when the function of the camera is activated, the main control circuit 100 sends the A*B data acquired from the camera to the drive circuit that controls the current display area, and the drive circuit that is bent to the rear enters a low power consumption mode at this time, thereby displaying the image in the display panel to complete the photographing process.

It should be understood that, in the embodiment of the present disclosure, for the convenience of description, the non-overlapping portion is limited within the second display area. In practical applications, if the non-overlapping portion is located in the first display area, the corresponding operation principle is similar. For example, if the non-overlapping portion is located in the first display area, the working display area is the second display area in the outward folded state. Therefore, in this embodiment, the main control circuit 100 is configured to control the second driving circuit 300 to drive the second display area to display when the display panel is in the outward folded state, and control the first driving circuit 200 to drive the first display area to be in a sleep state.

Similarly, in an embodiment of the present disclosure, if the non-overlapping portion is located in the first display area, the main control circuit 100 is configured to control the first driving circuit 200 to display in the non-overlapping portion of the first display area, for example, displaying prompt information such as missed calls, power information, and the like.

In summary, the control circuit of the embodiments of the present disclosure controls the display area according to the state of the display panel by the main control circuit. When the display panel is folded, according to the folding direction, the first display area or the second display area is controlled to display by the control circuit, and the front component is controlled to be in a front working state by the control circuit, and when the display panel is unfolded, the front component is converted into a rearward state, the second display area and the first display area are controlled to work together, and the front component is controlled to be in a rear working state. Therefore, under the premise of increasing the display utilization rate of the display area, the functional service of the front component is not affected, and the user's experience is improved.

It should be noted that the main control circuit 100, the first driving circuit 200 and the second driving circuit 300 may be implemented as hardware, software, firmware, and any feasible combination thereof. For example, the main control circuit 100, the first driving circuit 200 and the second driving circuit 300 may be special purpose or general purpose circuits, chips, apparatuses, and the like, and may also be a combination of a processor and a memory. For example, the main control circuit 100 may be a central processing unit (CPU), and the CPU is a conventional chip which is widely used in, e.g., mobile phones, and is configured to realize the functions described in the present application. For example, the first driving circuit 200 and the second driving circuit 300 may be integrated circuits which serve as the conventional gate driver as well as the conventional data driver in display panels, and are configured to realize the functions described in the present application. Specific implementation forms of the main control circuit 100, the first driving circuit 200 and the second driving circuit 300 are not limited in the embodiments of the present disclosure.

In the description of the present specification, the description of the terms "an embodiment", "some embodiments", "example", "specific example", "some examples" or the like means that the specific features, structures, materials, or features described by the connection of the embodiments or examples are included in at least one embodiment or example of the disclosure. In the present specification, the schematic description of the above terms is not necessarily directed to the same embodiment or example. Furthermore, the particular features, structures, materials, or characteristics described may be combined in a suitable manner in any one or more embodiments or examples. In addition, various embodiments or examples described in the specification, as well as features of various embodiments or examples, may be combined and assembled.

Any description of process or method in the flowcharts or otherwise described herein may be understood to represent a module, segment or portion of code comprising one or more executable instructions for implementing the steps of a custom logic function or process. The scope of the embodiments of the present disclosure includes additional implementations, which may not be in the order shown or discussed, including performing functions in a substantially simultaneous manner or in reverse order according to the functionality involved, and this should be understood by those skilled in the art to which the embodiments of the present disclosure pertain.

The logic and/or steps as shown in the flowchart or described herein by other manner, for example, may be considered as an ordered list of executable instructions for implementing logical functions, and may be embodied in any computer readable medium, for use in or in connection with an instruction execution system, apparatus, or device (such as a system based on a computer, a system including a processor, or other systems that can fetch instructions and execute instructions from an instruction execution system, apparatus, or devices). For the specification, a "computer-readable medium" may be any devices that can contain, store, communicate, propagate, or transport a program for use in an instruction execution system, apparatus, or devices, or any devices that can be used in connection with such an instruction execution system, apparatus, or devices. More specific examples (non-exhaustive list) of computer readable media include the following: electrical connection (electronic device) with one or more wires, portable computer disk cartridge (magnetic device), random access memory (RAM), read only memory (ROM), erasable editable read only memory (EPROM or flash memory), fiber optic device, and portable compact disk read only memory (CDROM). Additionally, the computer readable medium can even be a paper or other suitable medium on which the program can be printed, because the program may be obtained by electronical manner, for example, by optical scanning for paper or other medium, followed by editing, interpretation or, if necessary, processing in other suitable manner, and then the program may be stored in a computer memory.

It should be understood that portions of the disclosure may be implemented in hardware, software, firmware or a combination thereof. In the above-described embodiments, multiple steps or methods may be implemented by software or firmware stored in a memory and executed by a suitable instruction execution system. For example, if implemented in hardware and in another embodiment, it can be implemented using any one of the following techniques known in the art or a combination thereof: discrete logic circuits including logic gate circuits for implementing logic functions on data signals, application specific integrated circuits including suitable combinational logic gate circuits, programmable gate arrays (PGAs), field programmable gate arrays (FPGAs), and the like.

It may be understood by those skilled in the art that all or part of the steps involved in implementing the method of the above embodiments may be implemented by instructing related hardware by a program. The program may be stored in a computer readable storage medium, and the program, when executed, includes one or a combination of the steps of the method in the embodiments.

In addition, each functional unit in each embodiment of the present disclosure may be integrated into one processing module, or each functional unit may exist physically separately, or two or more units may be integrated into one module. The above integrated modules may be implemented in the form of hardware or in the form of software functional modules. The integrated modules, if implemented in the form of the software functional modules, and sold or used as separate products, may also be stored in a computer readable storage medium.

The storage medium mentioned above may be a read only memory, a magnetic disk, an optical disk or the like. Although the embodiments of the present disclosure have been shown and described above, it is understood that the above embodiments are illustrative and are not to be construed as limiting, and variations, modifications, alterations and variations of the above-described embodiments may be made by those skilled in the art within the scope of the disclosure.

The foregoing merely are exemplary embodiments of the disclosure, and not intended to define the scope of the disclosure, and the scope of the disclosure is determined by the appended claims.

What is claimed is:

1. A display device, comprising: a display panel that is foldable and a housing that is foldable and configured for supporting the display panel;
    wherein the display panel has a folding axis and is divided into a first display area and a second display area along the folding axis;
    the first display area and the second display area partially overlap in a case where the display panel is in a folded state along the folding axis, and the second display area comprises a non-overlapping portion that does not overlap the first display area; and
    a component is provided at a position of the housing supporting the non-overlapping portion.

2. The display device according to claim 1, wherein the component comprises a camera;
    the camera is configured to image by a first resolution when the display panel is in the folded state; and
    the camera is configured to image by a second resolution when the display panel is in an unfolded state;
    wherein the second resolution is higher than the first resolution.

3. The display device according to claim 2, wherein the first resolution matches a resolution of the first display area; and the second resolution matches a resolution of the display panel.

4. The display device according to claim 3, wherein the folding axis is parallel to at least one side of the display panel.

5. The display device according to claim 3, wherein the display panel is foldable in a clockwise direction or a counterclockwise direction in a plane perpendicular to the folding axis to form an outward folded state or an inward folded state,
    in the outward folded state, the first display area and the second display area are away from each other, and
    in the inward folded state, the first display area and the second display area face with each other.

6. The display device according to claim 2, wherein the folding axis is parallel to at least one side of the display panel.

7. The display device according to claim 2, wherein the display panel is foldable in a clockwise direction or a counterclockwise direction in a plane perpendicular to the folding axis to form an outward folded state or an inward folded state,
    in the outward folded state, the first display area and the second display area are away from each other, and
    in the inward folded state, the first display area and the second display area face with each other.

8. A control circuit for controlling display of the display device according to claim 2.

9. The display device according to claim 1, wherein the folding axis is parallel to at least one side of the display panel.

10. The display device according to claim 9, wherein the display panel is foldable in a clockwise direction or a counterclockwise direction in a plane perpendicular to the folding axis to form an outward folded state or an inward folded state,
in the outward folded state, the first display area and the second display area are away from each other, and
in the inward folded state, the first display area and the second display area face with each other.

11. A control circuit for controlling display of the display device according to claim 1.

12. The control circuit according to claim 11, wherein the control circuit comprises: a main control circuit,
a first driving circuit configured to drive the first display area of the display device, and
a second driving circuit configured to drive the second display area of the display device,
wherein the main control circuit is electrically connected to the first driving circuit and the second driving circuit, and is configured to control the first driving circuit and the second driving circuit according to the folded state of the display panel of the display device.

13. The control circuit according to claim 12, wherein the main control circuit is configured to control the first driving circuit to drive the first display area to display, and control the second driving circuit to drive the second display area to be in a sleep mode, in a case where the display panel is in an outward folded state.

14. The control circuit according to claim 13, wherein the main control circuit is electrically connected to a camera in the component of the display device;
the main control circuit is configured to transmit an image signal acquired by the camera to the first driving circuit, when the camera is activated, in the case where the display panel is in the outward folded state; and
the first driving circuit is configured to drive the first display area to display according to the image signal.

15. The control circuit according to claim 12, wherein the main control circuit is configured to control the second driving circuit to drive the second display area to display in the non-overlapping portion in a case where the display panel is in an inward folded state.

16. The control circuit according to claim 15, wherein the main control circuit is configured to transmit prompt information to the second driving circuit, in a case where the prompt information to be displayed is generated or acquired and the display panel is in the inward folded state; and
the second driving circuit is configured to drive the second display area to display according to the prompt information.

17. The control circuit according to claim 12, wherein the main control circuit is configured to control the first driving circuit to drive the first display area and control the second driving circuit to drive the second display area in a case where the display panel is in an unfolded state.

18. The control circuit according to claim 17, wherein the main control circuit is configured to correspondingly transmit a part of an image signal of a single frame acquired by a camera to the first driving circuit, and to correspondingly transmit another part of the image signal to the second driving circuit, in a case where the camera is activated and the display panel is in the unfolded state;
the first driving circuit is configured to drive the first display area to display according to the part of the image signal; and
the second driving circuit is configured to drive the second display area to display according to the another part of the image signal.

19. The display device according to claim 1, wherein the display panel is foldable in a clockwise direction or a counterclockwise direction in a plane perpendicular to the folding axis to form an outward folded state or an inward folded state,
in the outward folded state, the first display area and the second display area are away from each other, and
in the inward folded state, the first display area and the second display area face with each other.

20. The display device according to claim 1, wherein the component is located on a side away from the second display area, and the component is exposed by the first display area and faces a side where the first display area is located when the display device is in an outward folded state.

* * * * *